Feb. 27, 1962 T. L. SHERIDAN ET AL 3,023,375
TRANSISTOR BLOCKING OSCILLATOR POWER SUPPLY
Filed Jan. 26, 1960

INVENTORS
THOMAS L. SHERIDAN
RICHARD A. NYBERG
BY
ATTORNEYS

United States Patent Office 3,023,375

Patented Feb. 27, 1962

3,023,375

TRANSISTOR BLOCKING OSCILLATOR POWER SUPPLY

Thomas L. Sheridan, 3950 Lamesa Lane, San Jose, Calif., and Richard A. Nyberg, 551 Hearst Ave., San Francisco, Calif.

Filed Jan. 26, 1960, Ser. No. 4,827
4 Claims. (Cl. 331—112)
(Granted under Title 35, U.S. Code (1952), sec. 266)

The invention described herein may be manufactured and used by or for the Government of the United States of America for governmental purposes without the payment of any royalties thereon or therefor.

This invention relates to a transistor blocking oscillator power supply and more particularly to a transistor blocking oscillator power supply in which the operating efficiency does not vary over wide limits with variations of temperature, battery potential and transistor beta.

In the prior art the combinaion of battery and transistor blocking oscillator as a current interrupter gave promise of yielding smaller, more efficient power supplies with fewer maintenance problems and greater reliability where low output power was required than the former vacuum tube types. There still remained, however, three important disadvantages in the transistor blocking oscillator power supplies which had been developed in the prior art. In order to have sufficient output power at the low end of the input battery voltage range of the power supply, it was necessary to overdrive the transistors at the higher voltage end of the range, resulting in more than enough output power when the batteries were new or fresh. Since regulators have a rising current-voltage characteristic, more current than necessary was drawn when the batteries were new and at their highest potential. The corresponding excess current passed through the regulator and did not contribute to the useful load of the supply. Hence, the efficiency of the power supply was greatly reduced.

The second problem was that in order to compensate the power output for the lowering of beta, i.e., base to emitter current gain, of the transistors at low temperaures it was necessary to have the supply put out an excess of power at high temperatures, since, as the temperature of the transistor decreases the base resistance increases causing the base current and consequently the collecor current to decrease. This resistance change has the same effect on a blocking oscillator pulse as if the beta of the transistor had been lowered and is referred to subsequently as beta change with temperature.

The third disadvantage is very similar to the second in that in any particular type of transistor there is found to be a wide variation in beta among the individual transistors. The power supply must therefore be designed to operate with transistors of the lowest beta. If high beta transistors are used in the same circuit in place of the low beta transistors, then excess power is drawn into the input and excess power is furnished to the output. This excess power is again wasted in the power supply regulator.

It is thus an object of the present invention to provide a transistor blocking oscillator power supply which holds the input and output power almost constant over the operating range of the input batteries.

Another object is the provision of a transistor blocking oscillator power supply in which the operating efficiency does not vary over a wide range with a change of transistor temperature.

Still another object is the provision of a transistor blocking oscillator power supply in which the operating efficiency does not vary over a wide range with a varying of the individual transistor beta rating.

According to the invention, a transistor blocking oscillator is utilized as the primary source in a high voltage D.C. power supply. As pointed out with reference to the prior art the disadvantages to be overcome are the varying of operating efficiency with variations of input voltage, temperature, and transistor beta. These are accomplished by placing an inductance of the proper value in series with the blocking oscillator feedback circuit between the emitter and base of the transistors utilized as the blocking oscillator. As is well known, the cut-off time of a transistor operated as a blocking oscillator is determined by the charge on the blocking capacitor assosiated therewith and the discharge time of the blocking capacitor. At the start of the conducting cycle when the capacitor charging current is maximum, energy is stored in an inductance placed in series with the emitter to base feedback circuit. If for any reason the charging current is excessive due, for example, to fresh batteries, unusually high transistor beta, or low ambient temperature, the inductance will store proportionately more energy. When the charging current tends to decrease due to a decrease of inductive or capacitive feedback between collector and base, the inductance will, of course, return the stored energy to the circuit resulting in a higher charge on the blocking capacitor. This in turn will result in a longer cut-off time of the blocking oscillator transistor which has the effect of lowering the output voltage. When the initial charging current of the charging capacitor is lower due to a reversal of any of the above named conditions, the inductance, of course, will store less energy resulting in a smaller charge on the blocking capacitor and a higher frequency of operation of the blocking oscillator. Thus, the input and output power will be held relatively constant as well as the overall efficiency, since less power is dissipated in the regulator or load side of the power supply.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
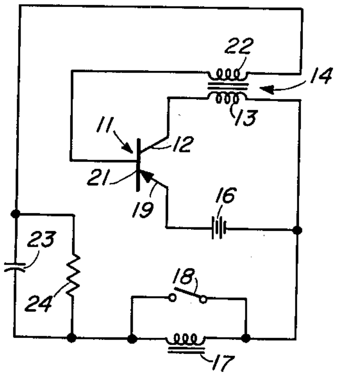
FIG. 1 is a schematic diagram of a blocking oscillator circuit which can utilize the present invention.

Referring now to FIG. 1 there is shown transistor 11 having collector element 12 connected through primary winding 13 of transformer 14 to the negative terminal of battery 16 and one side of inductance 17 and switch 18. Emitter 19 of transistor 11 is connected to the positive terminal of battery 16. Base 21 of transistor 11 is connected through secondary winding 22 of transformer 14 to one side of capacitor 23 and resistor 24. The other sides of capacitor 23 and resistor 24 are connected to the other side of inductance 17 and switch 18.

Figure 2:
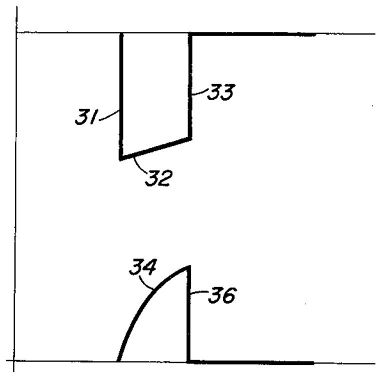
FIG. 2 shows the current wave forms present in FIG. 1.

Referring to FIG. 2, there is shown base current wave form having leading edge 31, negative portion 32 and a trailing edge 33. The collector wave form has leading edge 34 and trailing edge 36.

Figure 3:
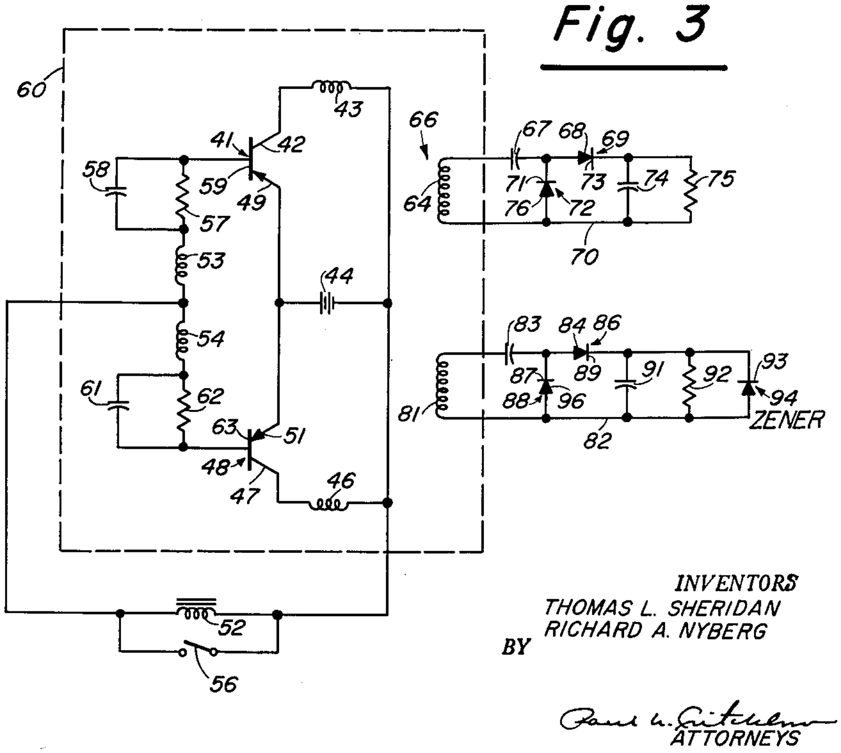
FIG. 3 is a schematic representation of another embodiment of the present invention.

Referring now to FIG. 3, there is shown transistor 41 having collector electrode 42 connected through primary winding 43 to the negative side of battery 44 and primary winding 46 to collector 47 of transistor 48. The positive terminal of battery 44 is connected to emitters 49 and 51 of transistors 41 and 48, respectively. The negative terminal of battery 44 is also connected through inductance 52 to the junction of feedback windings 53 and 54. Switch 56 is connected across inductance 52. The other side of feedback winding 53 is connected through resistor 57 and capacitor 58 in parallel to base 59 of transistor 41. The other side of feedback winding 54 is connected through capacitor 61 and resistor 62 in parallel, to base 63 of transistor 48. Secondary winding 64 of transformer 66 has one end connected to common bus 70 and the other end connected through capacitor 67 to anode 68 of diode 69 and to cathode 71 of diode 72. Cathode 73 of diode 69 is connected through capacitor 74 and resistor 75 in parallel to the common bus 70. Anode 76 of diode 72 is also connected to the common bus 70. Secondary winding 81 is connected between common bus 82 and capacitor 83. The other side of capacitor 83 is connected to anode 84 of diode 86 and cathode 87 of diode 88. Cathode 89 of diode 86 is connected through capacitor 91 and resistor 92 in parallel to common bus 82 and is connected to cathode 93 of zener diode 94, the anode of which is connected to common bus 82. Anode 96 is connected to common bus 82. Broken line 60 indicates a common core linking windings 43, 46, 53, 54, 64, and 81.

*Operation*

Referring again to FIG. 1, the operation of a simple transistor blocking oscillator will be described. In the base to emitter circuit, electrons will flow from battery 16 through switch 18, assuming it is closed, through resistor 24 and feedback winding 22 to base 21 of transistor 11 and, hence, to the emitter 19 and the positive terminal of battery 16. This is the emitter to base D.C. feedback path. Electrons will also flow from the negative terminal of battery 16 through primary windings 13 of transformer 14 and collector 12 of transistor 11 and emitter 19 of transistor 11 back to the positive side of battery 16. During the electron flow in the collector circuit a magnetic field is build up in primary winding 13 of transformer 14 which induces an E.M.F. in feedback winding 22, the negative side of which is tied to base 21, which will drive electrons on to the base causing the transistor to conduct more heavily in the base emitter loop which again increases conduction in the collector emitter loop increasing the feedback to the base 11 through transformer 14. The electron flow in the base circuit through resistor 24 charges capacitor 23 negative on the bottom and positive on the top.

Correlating the wave forms of FIG. 2 now with the circuit of FIG. 1, it is seen that leading edge 31 has been the base current build-up which has just been described. The collector current build-up shown at 34 is, of course, impeded by the inductance of primary winding 13 of transformer 14 and eventually begins to level off as saturation is approached. Capacitor 23 at this point builds up a voltage in opposition to battery 16 which again tends to reduce base current flow causing a partial collapse of the magnetic field in primary winding 13 which induces an E.M.F. in feedback winding 22, 180° out of phase with the previous voltage feedback, i.e., the base is now driven in a positive direction. This will cause the base current to fall sharply to zero as indicated by trailing edge 33 in FIG. 2 and, of course, the collector will fall to zero simultaneously. At this point capacitor 23 will discharge through resistance 24 maintaining a positive voltage on base 21 which will hold transistor 11 at cut-off until capacitor 23 has almost completely discharged through resistor 24. The cycle will then begin again, i.e., the base to emitter current will start to flow causing more base to emitter current to flow until such time as the field created by primary winding 13 of transformer 14 begins to collapse and the transistor is again cut off. It is thus pointed out with respect to the blocking oscillator of FIG. 1 that if switch 18 is closed shorting inductance 17 the three principal causes of gain instability and loss of power exist.

First, if the beta of the transistor varies the output will drop below an acceptable level, and the output of the power supply will also drop.

The prior art overcame this difficulty by increasing the base drive current which can be accomplished by lowering the value of R21, by increasing the capacitance of capacitor 23, or by increasing the number of turns or the turns ratio between primary 13 and feedback winding 22 of transformer 14. If the base current were made large enough by any one of these methods, the transistor 11 is driven into saturation where the beta of the transistor is least sensitive to temperature changes. But in order to obtain the large driving power capable of saturating the transistor current, much greater input power to the system as a whole must be supplied, which increases the power output to the load and regulator above that required. As previously pointed out excess power is then dissipated in the voltage regulator and hence wasted. This results in usable power efficiency being greatly decreased, or in the absence of regulation the output voltage fluctuating widely with a variation of the three above mentioned parameters.

In solution to the problem of the transistor beta falling with temperature the second cause of low efficiency is obviated in the manner mentioned above since this problem is actually one of a variable beta in transistors.

The third major difficulty in a simple blocking oscillator power supply is also one of wasted power. In a practical supply the battery must operate over a voltage range starting at a value when the batteries are new and terminating at some predetermined lower value. At the terminating battery voltage the power supply must still be able to furnish the necessary output power, therefore the power supply must be designed to operate at this lower battery potential. When the battery voltage is highest, the input current is also largest, so that the input power almost doubles. The consequent excess output power is again dissipated in the voltage regulator and wasted. Thus at the higher battery potential the usable power efficiency is low.

Referring again to FIG. 1, if switch 18 is open, placing inductance 17 in series with the emitter base feedback circuit, several advantageous effects follow. Choke 17 acts as a current regulator which keeps the input and output power almost constant over the operating range of the battery while at the same time keeping the base drive energy at high value. The high base drive energy gives the power supply temperature stability and also allows the use of transistors having a wide beta spread. During the initial charge cycle of capacitor 23, energy is stored in the field of inductance 17 and held there until the charging current of capacitor 23 attempts to decrease. At this point, the magnetic field of inductance 17 begins to collapse inducing a current in inductance 17 in the same direction. This, of course, will cause capacitor 23 to keep charging to a voltage much higher than it ordinarily would have. This in turn, during the cut-off portion of the blocking oscillator cycle, will cause capacitor 23 to take a longer time to discharge through resistance 24 resulting a much lower blocking oscillator frequency. This, in a lower current power supply, will automatically lower the output voltage as will be discussed later. When the voltage of battery 16 has dropped due to operation time, the charging current of capacitor 23, i.e., the base emitter current of transistor 11 will, of course, be correspondingly lowered. This will result in less energy being stored in inductance 17 resulting in a lower final charge on capacitor 23 which will have the effect of increasing the frequency of the blocking oscillator.

Referring now to FIG. 3, a practical transistor blocking oscillator power supply is illustrated. The blocking oscillator portion operates identically to the simple single ended circuit shown in FIG. 1, i.e., the feedback from the primary windings 43 and 46 to feedback windings 53 and 54 to base electrodes 59 and 63 cause the blocking action and the blocking capacitors 58 and 61 discharging through resistors 57 and 62 set the frequency of the blocking oscillator. In this embodiment inductance 52 is placed in the common charge path of capacitors 58 and 61 which results in the same regulatory action described with respect to FIG. 1. The secondary circuits of windings 64 and 81 are conventional and well-known in the art and thus will not be described in great detail. It is pointed out that the high voltage secondary 64 is unregulated due to the extremely low current handling capacity at higher voltages. The time constants of the circuit determined by capacitors 67 and 74 and resistor 75 are short, allowing the output voltage to be determined by the amplitude and frequency of voltage pulses in secondary 64. Thus, as in the case of the battery voltage dropping and the amplitude then in turn decreasing, and zener diode 94 is placed across the output as a will compensate for the lower amplitude resulting in a relatively constant output voltage across resistor 75.

The low voltage rectifier from secondary winding 81 is identical to the high voltage rectifier with two exceptions. The time constants as determined by capacitors 83 and 91 and resistor 92 are larger, resulting in more filtering, and zene diode 94 is placed across the output as a voltage regulator. It is thus only necessary to maintain the zener breakdown voltage across zener diode 94 to maintain a constant output voltage across resistor 92.

Obviously many modifications and variations of the present invention are possible in the light of the above teachings. It is therefore to be understood that within the scope of the appended claims the invention may be practiced otherwise than as specifically described.

What is claimed is:

1. A blocking oscillator comprising a pair of substantially identical transistors having emitter, base and collector electrodes, a transformer including a center-tapped primary winding, a secondary winding and a center-tapped feedback winding, a source of voltage, means connecting said source of voltage through the primary of said transformer to the emitter-collector electrodes of said transistors in push-pull connection, feedback winding connected between said base and emitter electrodes in a positive feedback connection, an inductance connected in series with said emitter electrodes and said feedback winding center-tap and means adapted to connect an external load to the terminals of said secondary winding.

2. A transistor square wave oscillator comprising a pair of transistors having at least emitter, base and collector electrodes, a transformer having a primary winding, a secondary winding, and a feedback winding, means adapted to connect a source of voltage through said primary winding to the emitter and collector electrodes of said transistors in push-pull connection, means including an inductance connecting said feedback winding to the base and emitter electrodes of said transistors in a positive feedback connection, and means adapted to connect an external load across the said secondary winding.

3. In a blocking oscillator of the type employing at least one transistor having at least base, emitter, and collector elements energized by a D.C. energy source and utilizing a base feedback blocking capacitor, said transistor having base and emitter electrodes, said capacitor having a charging path including the base and emitter of said transistor, the improvement comprising an inductance in serial relationship with the charging path of said capacitor, whereby energy stored in said inductance during the initial charging of said blocking capacitor will be returned as charging current to said blocking capacitor decreases, resulting in a charge on said capacitor proportional to the voltage of said D.C. energy source, the temperature of said transistor, and the beta of said transistor.

4. In a transistor power supply of the type employing a transistor blocking oscillator utilizing a blocking capacitor in positive base feedback, said transistor having base and emitter electrodes, said capacitor having a charging path including the base and emitter of said transistor, the improvement comprising an inductance in serial relationship with the charging path of said capacitor, whereby energy stored in said inductance during the initial charging of said blocking capacitor will be returned as charging current to said blocking capacitor decreases, resulting in a charge on said capacitor proportional to the voltage of said D.C. energy source, the temperature of said transistor, and the beta of said transistor.

References Cited in the file of this patent

UNITED STATES PATENTS

| | | |
|---|---|---|
| 2,188,653 | Fandell et al. | Jan. 30, 1940 |
| 2,841,700 | Hallden | July 1, 1958 |
| 2,849,615 | Gustafson | Aug. 26, 1958 |

FOREIGN PATENTS

| | | |
|---|---|---|
| 805,561 | France | Dec. 19, 1936 |

OTHER REFERENCES

Schenkerman: Radio Electronics, August 1956, vol. 27, No. 8, page 38.